Nov. 11, 1924.
W. A. SHALLENBERG
SELF LUBRICATING PISTON
Filed April 28, 1923
1,515,077
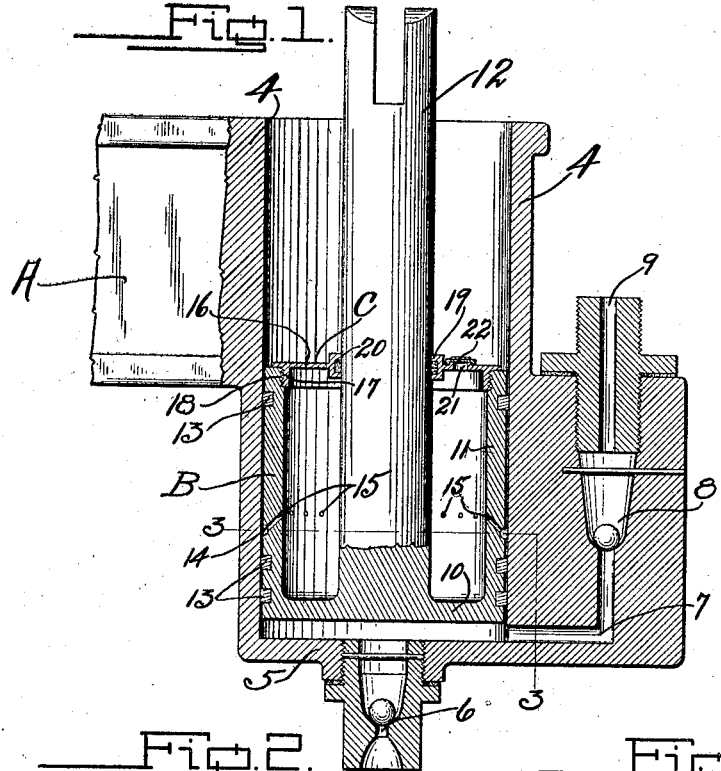
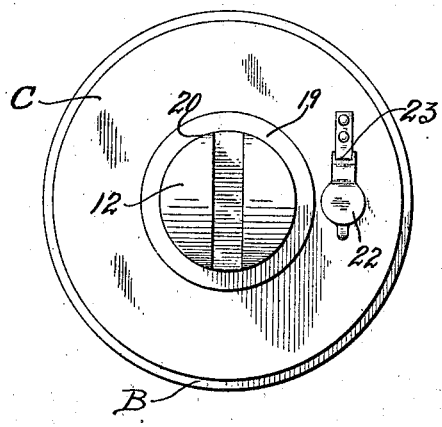
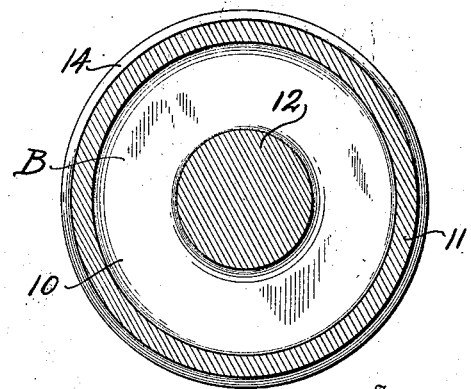
Inventor
Walter A. Shallenberg
By Lancaster & Allwine
Attorneys Patented Nov. 11, 1924.

1,515,077

UNITED STATES PATENT OFFICE.

WALTER A. SHALLENBERG, OF SALEM, OHIO.

SELF-LUBRICATING PISTON.

Application filed April 28, 1923. Serial No. 635,324.

*To all whom it may concern:*

Be it known that I, WALTER A. SHALLENBERG, a citizen of the United States, residing at Salem, in the county of Columbiana and State of Ohio, have invented certain new and useful Improvements in Self-Lubricating Pistons, of which the following is a specification.

This invention relates to pistons of a self lubricating type especially to pistons used for tire pumps, air condensers, various makes of pumps as well as internal combustion engines.

The primary object of this invention is to provide a piston which will allow for a continuous flow of lubricating oil over a long period of time without attention on the part of the operator.

A further object of the invention is the provision of a piston construction allowing for storage of lubricating oil together with means for continually feeding the oil to the confronting surface of the piston and cylinder.

A still further object of the invention is to provide a piston with a suitable closure, having a filter opening by means of which the operator may conveniently refill the receptacle without inconvenience.

The construction of this piston is especially adapted for use with the air compressor pump which forms the subject matter of my application, Serial No. 635,325, filed April 28, 1923.

Other objects of the invention will appear in the following detailed description taken in connection with the accompanying drawing, forming a part of this specification, and in which drawing:

Figure 1 is a vertical central section through a cylinder of an air pump showing the improved piston in use.

Figure 2 is a top plan view of the piston alone, showing the filler opening cap.

Figure 3 is a section through the piston on the line 3—3 of Figure 1.

Referring to the drawings in detail, wherein similar reference characters designate corresponding parts throughout the views, the letter A designates the cylinder of an air compressor; B the piston; and C the closure for the lubricant receptacle formed by the piston B.

The cylinder of an air compressor B is shown for purposes of illustration only, and I do not limit my invention to the use alone. The piston is equally well adapted for use in internal combustion engines, hydraulic jacks and all types of air compressors. The cylinder A may consist of the walls 4 and bottom 5 having an intake ball valve 6 of any well known type. Passage 7 connects the cylinder chamber to outlet ball valve 8 and the operation is as follows: Valve 6 opens when piston B travels upward and allows air to enter the cylinder, simultaneously ball valve 8 closes and interrupts any escape. When piston B lowers, the air is compressed, ball valve 6 closes and valve 8 then opens to permit free passage of the air out through opening 9 and piped to any desired location.

Concerning the piston B, such may be of the ordinary form, commonly known as a trunk piston, having a head 10, skirt or wall 11, and a connecting rod 12. The piston rings 13 assure a working fit and an air tight connection. An annular groove 14 may be provided anywhere between the top and bottom of piston B, but it is preferable to locate it a little below half way just above the second piston ring 13, as shown in Figure 1. This location permits a gradual feeding of the lubricant by the "splash" method if desired and a more consistent feed if the cavity is filled to a level higher than the angular ducts or passageways 15.

To prevent loss of lubricant, and introduction of foreign particles, the cap C is supplied which may consist of the closure 16 having a depending flange 17 provided with a screw thread as at 18 to engage the screw threads on wall 11 of piston B. A packing box 19 may be formed at the opening to allow the passage of rod 12 without danger of leakage. Filling the cavity within the piston may be made easy by the provision of opening 21 which has a cap 22 hinged as at 23. This opening also allows frequent inspection of the oil supply.

Changes in details may be made without departing from the spirit or scope of my invention; but,

I claim:

In a self lubricating piston construction, a piston having a head and an annular wall, the annular wall being provided with oil passages positioned about its circumference, a piston rod extending from the piston head axially of the piston, a closure disc for the upper end of the piston positioned about the piston rod and removably connected with the walls of the piston, said closure disc being provided with a packing gland about the piston rod to form a tight connection therewith and said closure having a filler opening, and a removable closure for the filler opening.

WALTER A. SHALLENBERG.